(12) United States Patent
Osotio

(10) Patent No.: US 10,769,291 B2
(45) Date of Patent: Sep. 8, 2020

(54) AUTOMATIC DATA ACCESS FROM DERIVED TRUST LEVEL

(71) Applicant: Microsoft Technology Licensing, LLC, Redmond, WA (US)

(72) Inventor: Neal Osotio, Sammamish, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 201 days.

(21) Appl. No.: 15/620,654

(22) Filed: Jun. 12, 2017

(65) Prior Publication Data

US 2018/0357439 A1   Dec. 13, 2018

(51) Int. Cl.
*G06F 21/62* (2013.01)
*G06N 20/00* (2019.01)

(52) U.S. Cl.
CPC ......... *G06F 21/6218* (2013.01); *G06N 20/00* (2019.01)

(58) Field of Classification Search
CPC .... G06F 21/6218; G06F 21/316; G06N 20/00
USPC ........................................................ 726/28
See application file for complete search history.

(56) References Cited

U.S. PATENT DOCUMENTS

| 7,216,361 | B1 | 5/2007 | Roskind |
| 8,443,049 | B1 | 5/2013 | Geddes |
| 8,566,262 | B2 | 10/2013 | Deyo |
| 8,676,172 | B2 | 3/2014 | Farkas et al. |
| 8,713,704 | B2 | 4/2014 | Davis |
| 8,869,241 | B2 | 10/2014 | Davis |
| 8,892,709 | B2 | 11/2014 | Podlaseck et al. |
| 9,066,234 | B2 | 6/2015 | Karlson |
| 9,076,128 | B2 | 7/2015 | Horvitz |

(Continued)

FOREIGN PATENT DOCUMENTS

| CN | 101739499 A | 6/2010 |
| WO | 2013041955 A2 | 3/2013 |
| WO | 2015100496 A1 | 7/2015 |

OTHER PUBLICATIONS

Zeltser, Lenny, "Security of Third-Party Keyboard Apps on Mobile Devices", Published on: Mar. 23, 2015 Available at: https://zeltser.com/third-party-keyboards-security/.

(Continued)

*Primary Examiner* — Alexander Lagor
*Assistant Examiner* — Moeen Khan
(74) *Attorney, Agent, or Firm* — Medley, Behrens & Lewis, LLC

(57) ABSTRACT

Representative embodiments disclose mechanisms for automatically granting access to information based on a derived trust level. Communications between two users are evaluated to identify commonalities in user characteristics, data characteristics, and context of the communications to establish a trust level from one user to another. This information is utilized to establish a trust model between the two users. In future communications, the trust model is used to determine whether to grant access to information based on the current user characteristics, data characteristics and context. Requests for data are passed through the trust model to grant or deny access. Alternatively, data can be injected into a conversation when the appropriate characteristics are met. In alternative embodiments, security model parameters can be automatically adjusted and access granted or denied based on the security model.

18 Claims, 10 Drawing Sheets

(56) References Cited

U.S. PATENT DOCUMENTS

| | | | |
|---|---|---|---|
| 9,264,880 B2 | 2/2016 | Walsh et al. | |
| 9,319,390 B2* | 4/2016 | Yu | H04L 63/104 |
| 9,386,139 B2 | 7/2016 | Knight | |
| 9,660,967 B1* | 5/2017 | Paris | H04L 65/60 |
| 2006/0277591 A1 | 12/2006 | Arnold | |
| 2010/0185630 A1 | 7/2010 | Cheng | |
| 2010/0319063 A1 | 12/2010 | Koppolu | |
| 2012/0222132 A1 | 8/2012 | Burger | |
| 2013/0159433 A1 | 6/2013 | Chavan | |
| 2014/0380448 A1 | 12/2014 | Bailey | |
| 2015/0185995 A1* | 7/2015 | Shoemaker | G06F 3/0484 715/708 |
| 2015/0222606 A1* | 8/2015 | Yan | H04L 9/0847 713/171 |
| 2016/0078203 A1* | 3/2016 | Moloian | G06F 21/31 726/17 |
| 2016/0085773 A1 | 3/2016 | Chang et al. | |
| 2016/0373440 A1* | 12/2016 | Mather | H04L 63/0861 |

OTHER PUBLICATIONS

"SwiftKey Support", Retrieved on: Aug. 11, 2016 Available at: https://support.swiftkey.com/hc/en-us/articles/204609851-Using-the-Keyboard.

Cho, et al., "Keyboard or keylogger?: A security analysis of third-party keyboards on Android", In Proceedings of Thirteenth Annual Conference on Privacy, Security and Trust, Jul. 21, 2015, pp. 173-176.

"Trust No One: Evaluating Trust-based Filtering for Recommenders", In Proceedings of the Nineteenth International Joint Conference on Artificial Intelligence. John O'Donovan, Barry Smyth, Jul. 30, 2005. 3 pages.

"Managing Identity Trust for Access Control" Proceedings: In Architecture Journal, Gerrit J. van der Geest, Carmen de Ruijter Korver, Jul. 2008.

* cited by examiner

AUTOMATIC DATA ACCESS FROM DERIVED TRUST LEVEL

FIELD

This application relates generally to file system and data security. More specifically, this application relates to automatically granting or denying access to data and files based on a derived trust level.

BACKGROUND

Trust and privacy issues confront users every day through their interactions with technology, devices and information. Users decide how much to trust someone and typically grant or deny access based on how the user feels about another individual. For example, social media sites allow users grant or deny access to social media posts, and other information based on a relationship status. Typically, a user is presented with a dialog that allows the user to adjust security settings that grant or deny access to information.

Computer systems also typically have rich security infrastructure so that users can be granted or denied access to information using a rich set of criteria, such as where the information is stored, what the user's role in an entity is, and so forth. These security infrastructures are typically administered by an administrator or other information technology (IT) professional.

It is within this context that the present embodiments arise.

DETAILED DESCRIPTION

Figure 1:
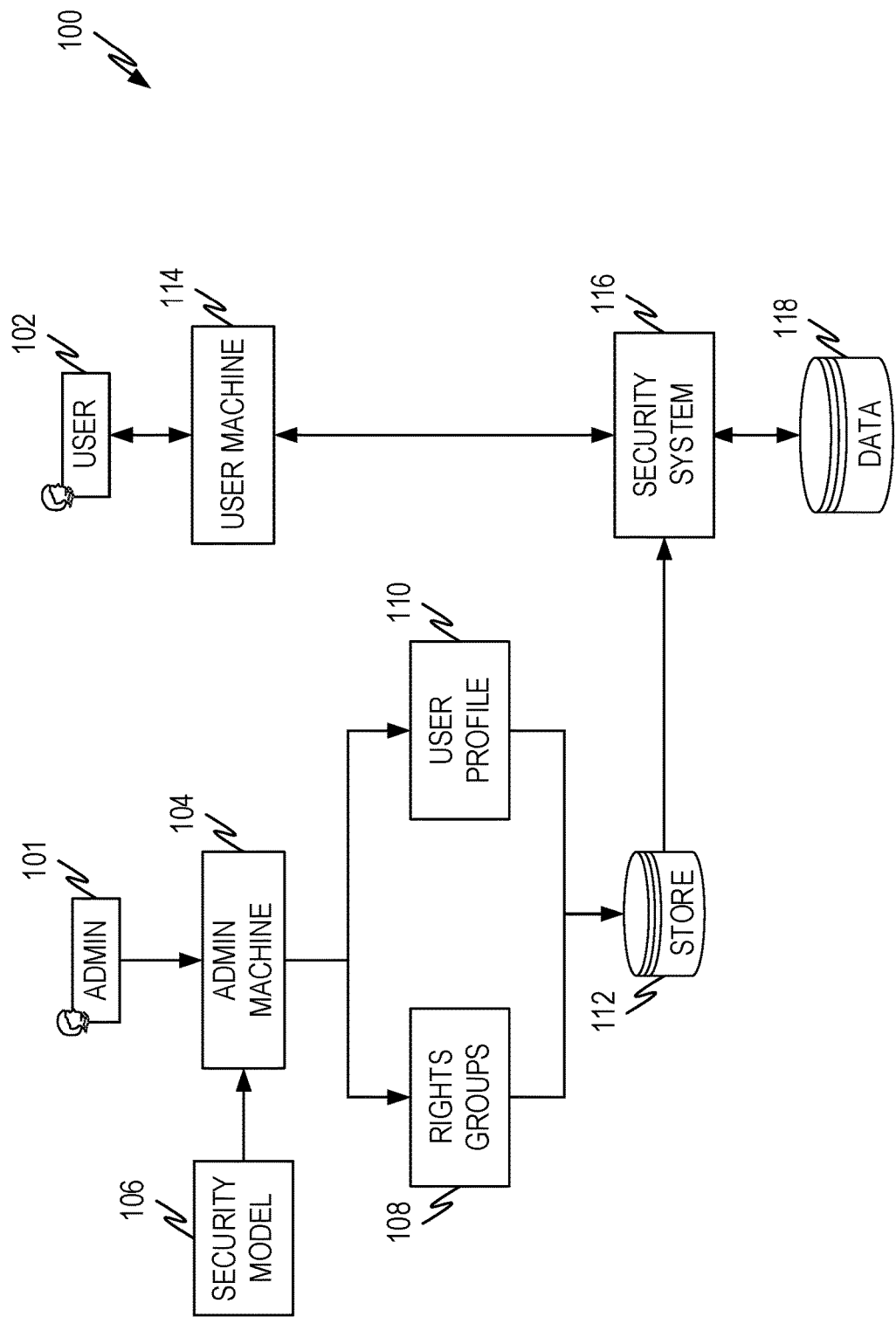
FIG. 1 illustrates an example of a representative prior art security infrastructure.

The description that follows includes illustrative systems, methods, user interfaces, techniques, instruction sequences, and computing machine program products that exemplify illustrative embodiments. In the following description, for purposes of explanation, numerous specific details are set forth in order to provide an understanding of various embodiments of the inventive subject matter. It will be evident, however, to those skilled in the art that embodiments of the inventive subject matter may be practiced without these specific details. In general, well-known instruction instances, protocols, structures, and techniques have not been shown in detail.

Overview

Current privacy and security models rely on explicit permission set by a user or administrator to grant access to information. For example, system administrators set Access Control Lists (ACLs), read/write permissions and so forth to allow users access to information stored on a system and/or corporate network. Users set privacy settings for social media content to determine scope visibility (e.g., items that are visible to friends, friends of friends).

Embodiments of this disclosure are directed to an automated way to make information available and/or to deny access to information in an automated way. The system utilizes machine learning methods and monitors interactions between users to determine what information a user trusts to others. Based on such interactions, the system can develop a trust model for the interactions. Trust models are specific to the interactions used to train them and thus specific to a particular user or a group of users having common attributes. A trust model will produce a trust level and/or access decision when presented with the appropriate information. The trust level can be compared to annotations on data to determine whether access is granted to the data.

A user's data can be annotated based on the interactions, the content of the data, the appropriate trust model and/or a data annotation model. The annotations set the access requirements for the data. For example, the annotations can specify the trust level and/or context that a requestor needs to have before access to the data will be granted.

A request for information comprises the user making the request, the information requested, and a context for the request. When a request is presented for access to information, one of the trust models is selected based on the user making the request and the request is presented to the trust model. The trust model ingests the request information and produces a trust level and/or an access decision (i.e., granting or denying access). If a trust level is produced, it can be compared to trust levels in annotated data and, when the trust level exceeds the trust level required, access can be granted to the data.

In an alternative embodiment, the system can monitor a conversation and/or ongoing communications between two users. The system monitors the communications and based on the communications, makes data available. This data can be injected into the conversation by being sent to the user that has been granted access to the data (either as part of the conversation or separately) or simply made available to the user that has been granted access.

In yet a further alternative embodiment, the trust model can be trained to adjust a rights system or security settings directly. Thus, a rights system or security systems that are used to determine who has access to certain data can be adjusted directly by the trust model. For example, the system identifies that a first user forwards email about a particular topic to a second user on a consistent basis. The system can determine that the second user should be granted access to data regarding the topic. The trust model can directly adjust the security and/or sharing parameters to allow the second user to access the information.

When a user is granted access to the data, the system can confirm with the data owner whether access should be granted. Thus, if the system decides that a user should be granted access to a set of data, the system can present a dialog, permissions box, etc. to the data owner indicating the derived trust level granted to the user, the data the user is to be granted access to and/or other information and ask the user to confirm that access should be granted.

Description

FIG. 1 illustrates an example of a representative prior art security infrastructure 100. In prior art systems, an admin 101 sets access privileges for a user 102 according to the security model 106 used by the system. The security model 106 typically can restrict or grant data access to a group of individuals (i.e., user groups or rights groups), set permissions on individual files/documents (such as read only, read write, etc.), set up Access Control Lists (ACLs) that indicate who can or cannot have access, and so forth. The specifics depend on the particular security model used by the system.

To set a user's data access privileges, the admin 101 typically logs into an admin machine 104 and sets up a user profile 110 for the user 102. The user profile can define the user 101 to the system such as through a user account that contains items like logon name, security/password requirements, and so forth. The admin 101 can also add the user 101 to various rights or user groups 108, such as administrators, users, etc. The admin 101 can also add the user to ACLs, set user permissions on files and so forth to define the scope of information the user can and cannot access. This information is saved by the system, such as in one or more data stores 112.

When the user 102 desires to access information, such as through a user machine 114, the request is monitored by the security system 116, which enforces the data access restrictions and/or grants access according to the settings set by the administrator 101.

In this scenario, access to data is governed by explicit settings administered by an administrator. If the user desires access to additional data that the user does not have access to, the user must request access, and an administrator must reconfigure the system to grant the user access.

In an alternative prior art scenario (not shown), the user can set permissions on data owned and/or created by the user. For example, in a social media network, a user is often able to specify (i.e., through a security interface) settings that limit who can and cannot see the user's data. Thus, posts made by a user on a social media site can be restricted to other users that have been granted "friend" status, or restricted to users that are "friends of friends" and so forth.

As in the scenario above, if the user desires to change whether another user can see the data the user must explicitly change the permission (e.g., grant public access to the data) or change the status of the other user (e.g., grant them "friend" status).

While allowing security of data so that only authorized users can see data, security and privacy models such as these do not respond well to changes in who can/cannot or should/should not have access to information. All changes require manual intervention and for environments where a user controls access (e.g., social media and/or other systems where a user can set access and/or control privileges), user intervention.

Figure 2:
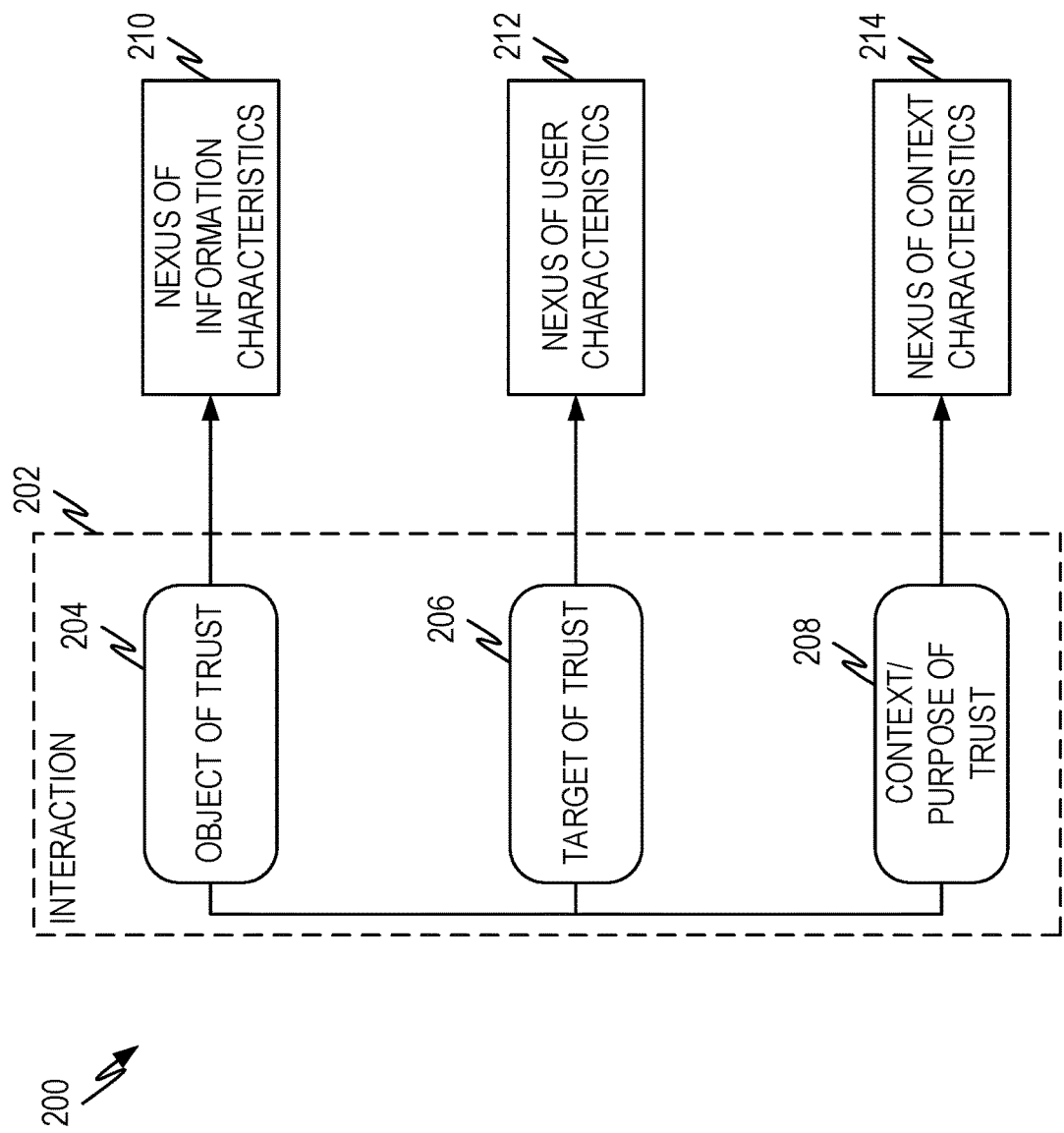
FIG. 2 illustrates an example of an interaction and information that can be derived therefrom.

FIG. 2 illustrates an example of an interaction 200 and information that can be derived therefrom. An interaction 202 comprises an object of trust 204, a target of trust 206 and a context of trust 208.

When two users (user 1 and user 2) have an interaction 202 where one user (user 1) discloses information to another user (user 2), the interaction 202 explicitly or implicitly includes three aspects. First there is an object of trust 204. The object of trust is the information that user 1 entrusts to user 2. In other words, the object of trust is the disclosed information. Second, there is the target of the trust 206. Trust is directional and runs from one user to another. In this example, the trust runs from user 1 to user 2. The target of the trust 206 is the end of that directional trust, in this case user 2. Third, there is the context or purpose of the trust 208. In this disclosure, context means the circumstances surrounding the interaction. Thus, context can include, but is not limited to, the channel by which the information is conveyed (e.g., email, text, in person), the circumstances surrounding the conveyance of information (e.g., a public meeting, a meeting with a limited set of attendees, a private conversation), the venue of the communication (e.g., a corporate meeting, a private conference room, a video conference), and so forth. In addition, there can be a particular purpose to the disclosure, such as conveying a home address so that a package can be shipped or a phone number so that contact can be reestablished later for a given purpose. Although purpose can be treated as a separate factor, for ease of discussion purpose will not be separately discussed and will be part of context. However, it need not be so in all embodiments of the disclosure, and embodiments can handle purpose as a separate factor.

Note that trust can be reciprocated, so user 2 can, in turn, trust user 1 (i.e., with certain information). In such an instance a new directional trust relationship is established from user 2 to user 1, and user 1 would be the target of the trust and so forth. While it can be helpful to think of trust as bi-directional in situations where reciprocal trust is established (i.e., user 1 trusts user 2 and user 2 in turn trusts user 1), unless the trust is truly symmetrical, it can be more useful to deal with reciprocal trust as two separate trust relationships.

By analyzing a series or sequence of interactions, such as by a machine learning process as disclosed below, characteristics of the interactions can be discovered. These characteristics can be used to describe the trust characteristics of a trust relationship. For example, by analyzing a series of interactions between user 1 and user 2, the system can discover that user 1 trusts user 2 with particular types of data in particular circumstances. Said another way, there can be a nexus of information characteristics 210 that user 1 trusts user 2 with in situations that have a nexus of context characteristics 214.

By analyzing further interactions between multiple users, the system can also discover a nexus of user characteristics 212 that are related to a nexus of information characteristics 210 and/or a nexus of context characteristics 212. For example, the system can discover that user 1 shares information regarding a particular project with coworkers in a particular group. Thus, the sequence of interactions can reveal that a nexus of information characteristics (e.g., information related to project Alpha), is related to a nexus of coworkers (e.g., team members of team Green), and/or a nexus of context characteristics (e.g., corporate communications such as corporate email, communication during work hours, communication within the corporate facilities).

Based on the relationships between the nexus of information characteristics 210, and/or nexus of user characteristics 212, and/or nexus of context characteristics 214, the system can ascertain that it is likely that a new member of a team should be granted access to information that the rest of the team is granted access to. In other words, machine learning models can be created based on user interactions that allow the system to identify users that should be given access to information in particular contexts. As discussed below, these machine learning models can adjust access (grant and/or deny) based on dynamic trust that is captured in the machine learning models by ongoing analysis using machine learning algorithms and/or user feedback.

Figure 3:
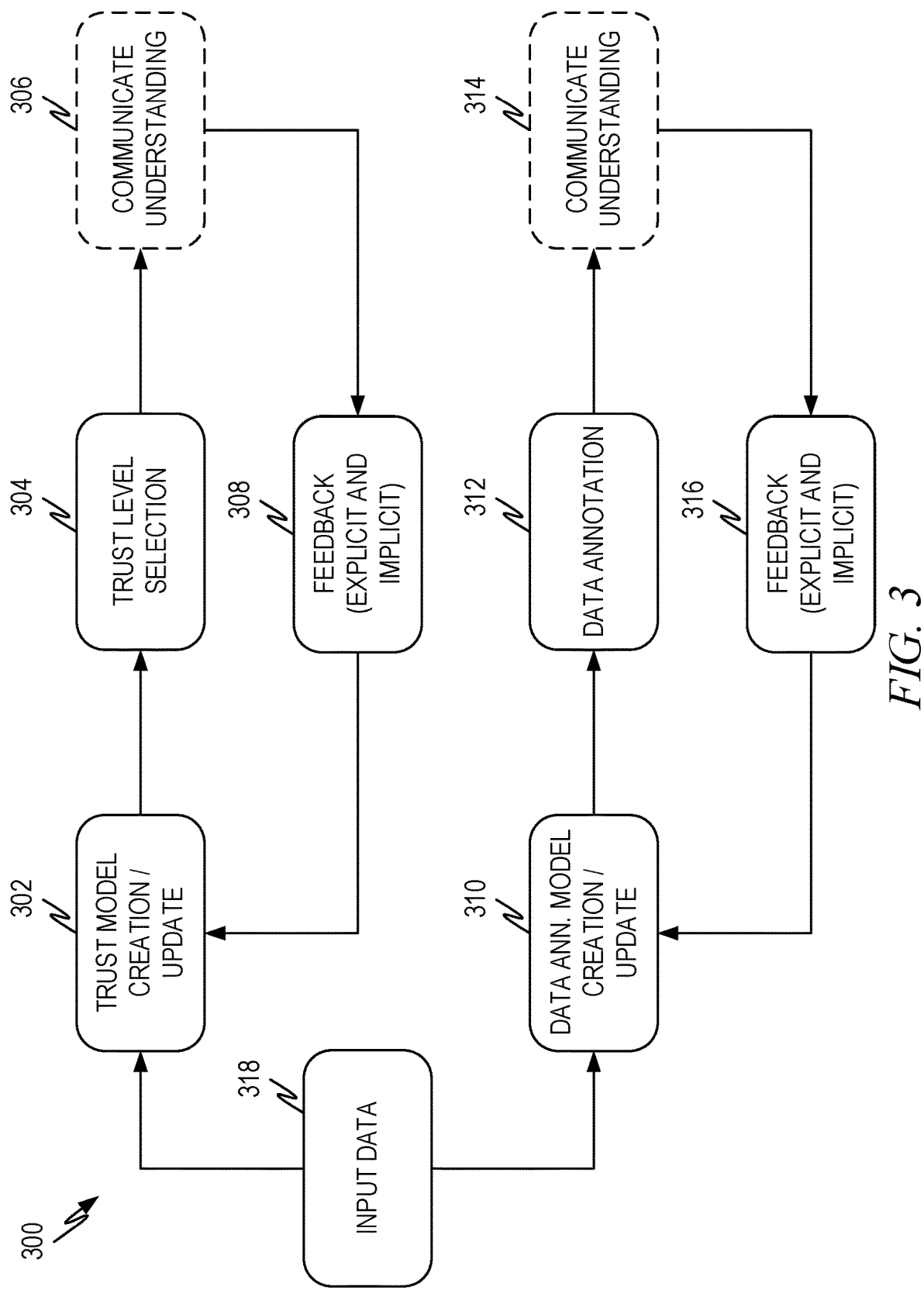
FIG. 3 illustrates an example architecture for creating and updating trust and data models according to some aspects of the current disclosure.

FIG. 3 illustrates an example architecture 300 for creating and updating trust and data models according to some aspects of the current disclosure. In this representative architecture, two loops are presented, a trust loop (302, 304, 306, 308) that applies to trust level identification and an annotation loop (310, 312, 314, 316) that applies to data annotation. At a high level, the architecture 300 in this diagram derives an annotation model 310 to annotate data 312 (e.g., user 1 data) with a trust level needed to access the data in appropriate circumstances in the annotation loop. The architecture 300 also derives a trust model 302 that takes current interaction information to ascertain a current trust level 304. Access can be granted when the trust level is appropriate for the annotation on given data.

In the context of this disclosure data access privileges and/or the data annotations described herein are referred to as trust level(s). Trust levels can be specific levels such as levels 1-5 with one level (either 1 or 5) being the most sensitive (i.e., most protected) level and the other end of the spectrum (either 5 or 1) being the least sensitive (i.e., least protected). Additionally or alternatively, trust level can be part of a set of privileges, such as read, write, access, and so forth. In still other embodiments, trust level can be multi-dimensional and have one dimension that represents the trust metric and another dimension that represents a context measure. For example, a given combination of trust level and context measure can identify the sensitivity (i.e., protection level) and context under which data can be accessed. In still other embodiments, additional dimensions can be used such as where multiple context measures are used (e.g., a channel and a venue). For example, trust level 1 data can only be conveyed by a private channel in a private venue. As another alternative, as described herein, the trust level may be multidimensional and have a score and/or other information associated with the various dimensions, such as the dimensions illustrated in FIG. 2 (i.e., target of trust, object of trust, context).

In operation, the system takes input data 318, which can be a series of interactions to initially derive a trust model 302 and/or an annotation model 310. The system selects the appropriate annotation model 310 and annotates a source user's data 312. A source user is the user that makes the disclosure and/or the user whose information is being protected (i.e., user 1 in the above examples). The system can communicate how the data is currently annotated as shown in operation 314. In some embodiments, whether the system communicates its annotations can be based on the sensitivity of the data. For example, the user may desire to see only the data that is being classified as most sensitive or data above/below a certain trust level or data that belongs to a specified multidimensional annotation region.

Operation 316 represents explicit and implicit feedback gathered by the system from the source user. Explicit feedback includes feedback given explicitly by the source user, such as where the user responds to a communication (operation 314) with adjustments to the system's understanding/choices. Explicit feedback can also include explicit actions taken by a user that indicate the system's choice is incorrect. For example, in operation (i.e., outside of annotation loop) if the system indicates it is going to grant access to a user's home address and that the home address was assigned a trust level and the source user adjusts the trust level, then the system can take that as explicit feedback from the source user.

Implicit feedback includes feedback that can be deduced from how the user interacts with the system or how the user interacts with other systems. Thus, if source user information is moved from a more public store to a more private store, that can be an indication to the system that the source user desires to grant that data more protection.

The feedback from the source user can be used to adjust the annotation model in operation 310. From a learning machine process standpoint, the feedback can represent annotated data used to adjust the training of the learning machine process that produces the learning machine model.

The trust loop operates in a similar manner. Once an initial trust model has been established (i.e., through training a machine learning process to produce a trained machine learning model), a further user interaction(s) 318 can be input to the trust model in operation 304 to select a trust level that is appropriate for the input interaction data. The system can communicate the selected trust level, the actions the system intends to take based on the selected trust level, and so forth as shown in operation 306. The system utilizes implicit and/or explicit feedback 308 to update the trust model.

Figure 4:
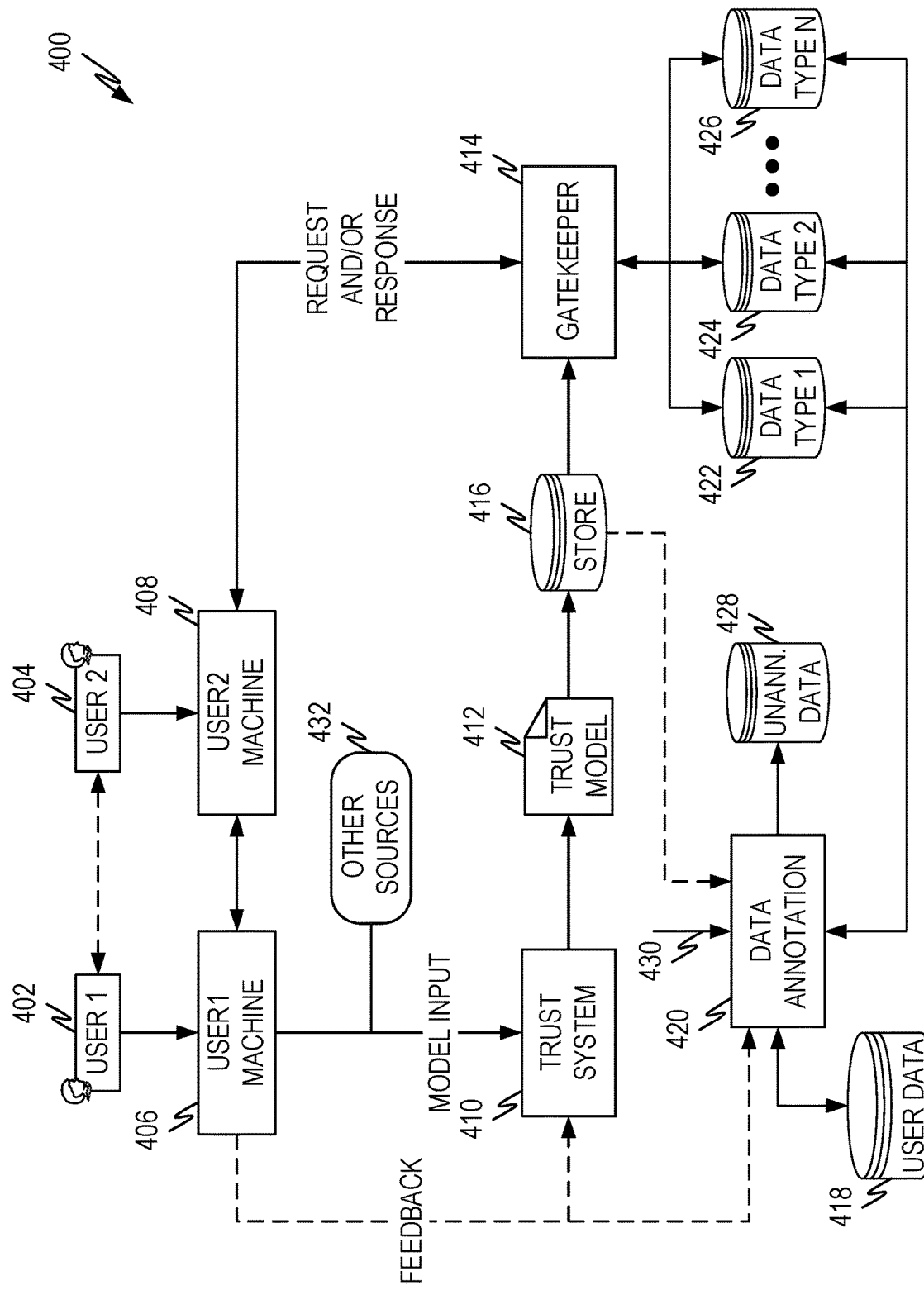
FIG. 4 illustrates a representative architecture for automatically granting access to data based on trust level according to some aspects of the current disclosure.

FIG. 4 illustrates a representative architecture 400 for automatically granting access to data based on trust level according to some aspects of the current disclosure. In this architecture 400, user data 418 represents the source user data. In the explanation of this architecture 400, user 1 402 will be taken as the source user. However, the system(s) can perform similar functions for other users.

User data 418 is input into a data annotation process 420, which annotates the data. Data annotation effectively divides the data into a plurality of "data types" 422, 424, 426, 428, which have different requirements for data access. In this disclosure data types are simply groups of information that have similar annotations and thus similar requirements for access. As noted in the diagram, one such data type can be unannotated data 428. Because the data is unannotated, the system does not grant automatic access to that data.

Data can be annotated using a data annotation model derived from interaction data using a machine learning process. The data annotation model can be the same as, or different from, the trust model described below. The data annotation model takes as an input user data and produces as an output annotations to associate with the data or, in some embodiments, annotated data (i.e., data and its associated annotations). Data annotations can be single dimensional (such as a single trust level that is needed before access can be granted) or can be multidimensional, with multiple dimensions representing different aspects.

As a representative example, the interaction model of FIG. 2 illustrates that interactions can be analyzed by a machine learning system to produce a model that can categorize interactions according to information characteristics, user characteristics and context characteristics. The annotations can capture one or more of these in any combination. Similarly, the individual information, user and context characteristics can be single or multidimensional.

For example, the information, user, and/or context characteristics can be modeled on one or more of cognitive, sensory and social dimensions in any combination. In this context, the cognitive dimension represents characteristics such as memory, knowledge, creative, and/or predictive aspects. The sensory dimension represents characteristics such as movement (physical), speech, and/or vision aspects. The social dimension represents characteristics such as connection and/or emotion aspects. The enumerated characteristics are non-exhaustive lists.

Using the representative example of the annotation model, user data can be analyzed (i.e., presented to a machine learning model produced by a machine learning process) and annotated using the various dimensions in the annotations. For example, a document may be analyzed and determined to contain information (i.e., a set of information characteristics) which the annotation model indicates should only be shared with individuals that the user has a close personal connection to (i.e., a set of user characteristics) and only be shared over a private channel in a setting where others are unlikely to gain access (e.g., see, hear) the data (i.e., a set of context characteristics).

User information usually does not exist in isolation, but is typically "bundled" in some fashion such as in a file, a document, profile, and so forth. These "bundles" of information will be referred to hereinafter as documents. Because documents can contain multiple types of information (i.e., information that an annotation model may annotate differently), the different information in the document may have multiple annotations that could apply. If the information is separable (i.e., if the system can separate out the different types of information), the separated information can be annotated separately. If the information cannot be separated, conflict resolution rules can apply to resolve conflicts among multiple annotations. For example, the document may be annotated at is most "strict" level (i.e., the level that requires the most trust to gain access to). Additionally, or alternatively, the annotation applied to the document can be a combination of different annotations that apply to different portions of the document. As yet another alternative or addition, the document can have multiple annotations that apply to different portions of the document and when the document is requested, only the portion that meets the presented trust level is returned. Thus, someone that meets the stricter trust level can see the whole document whole someone that meets the less strict trust level can only see a redacted document, with the information that they are not authorized to see removed.

As indicated by input 430 and the dashed line coming from store 416, the data annotation model can be developed using input data, such as interaction data described above. Such interaction data can comprise information regarding the source user, the target use, the data shared and the context. By way of example, and not limitation, the interaction data can comprise one or more of:

Individual profile data for the source and/or target user. This profile data can be a personal profile, a work/business profile, or both and will comprise information such as name, location, preferences, job category, group, and any other user characteristics in a user's personal and/or business profile.

Shared data and/or shared data characteristics. The actual data can be collected for later analysis and/or the characteristics of the data collected. If a trained data annotation model exists for the interaction information (as explained in the model selection aspects of the disclosure), the data can be characterized with annotations by annotation process 420. Additionally, or alternatively, the data characteristics can be the cognitive, sensory, and/or social characteristics previously discussed.

Contextual information such as location/GPS data, venue, channel, attendees at meetings, and so forth. Additionally or alternatively, data collected from sensors, such as those connected to the Internet of Things (IoT) can be collected to give environmental information such as temperature, ambient noise level, type of audio in the background, activities of the user, and so forth.

Also, as mentioned above, the data annotation model can be the same as, or different from, the trust model 412 described elsewhere. This is indicated by the dashed line from the store 416. The data annotation model is created through one or more supervised or unsupervised machine learning processes, such as a support vector machine (SVM) technique, a convolutional neural network, a deep neural network, decision tree process, k nearest neighbor process, kernel density estimation, K-means clustering, expectation maximization, and so forth. The interaction data is used by the machine learning process to train a data annotation model. The data annotation model takes as an input the data to be annotated and in some embodiments user characteristics and/or context characteristics and produces as an output annotations to be associated with the data and/or annotated data.

Data annotation can be an iterative and/or gradual process. When the annotation model is first trained and/or initialized, the data annotation process 420 can be used to annotate the user data 418. As noted above, when the system receives explicit and implicit feedback, the model can be updated. Additionally, as additional interactions are captured, the model can be updated. When the annotation model changes, the data can be re-annotated. Thus, initially the annotation process 420 may place more data in the unannotated section 428 because the process 420 has not been trained and/or updated to annotate that user data 418. As an example, if the data annotation model is first trained primarily corporate interactions, the data annotation model may learn how to annotate corporate type data, but is not yet able to annotate more personal data. That data would remain unannotated 428. As the system monitors further interactions, and begins to understand how and when a user shares more personal information, the model is updated and the personal data begins to be annotated and thus becomes available (422, 424, 426) to be shared in an automated fashion. Thus, as the data annotation process 420 learns the behavior of the user, such as what data is shared with what users and in what context, the model evolves (i.e., like the annotation loop of FIG. 3) and the user data 418 can be re-annotated to reflect the updated model.

Turning now to the trust system 410, as user 1 402 and user 2 404 have an interaction or engage in a conversation (i.e., a series of communications), the user's machine 406 can collect the relevant information. The user machines 406, 408 represent any machine that the user utilizes to interact with, such as a mobile phone, smartwatch, tablet, laptop or desktop computer, and so forth. To collect the relevant data (with the user's permission), the user's machine 406 can monitor keystrokes, voice input, touch input, and other input information as well as channels by which the input is transferred, such as text, email, voice call, and so forth. Additionally, sensor data from the device, such as GPS data, acceleration data, biometric data, or from other sources 432 can be collected as part of the collected interaction data, as described herein. Because the source user 402 (i.e., user 1)

is using the machine 406 to communicate, the machine 406 (with the user's permission) can collect interaction information. The machine 406 has access to the interaction information including the target user 404 (i.e., user 2), the information that is disclosed, as well as context information such as the channel by which it is communicated, the circumstances in which it is communicated, and so forth. Other information from other sources and sensors can also provide information for the interaction. For example, environmental sensor data, sensor data from a band, smartwatch, or other biosensor (heart rate, activity level, blood pressure, skin temperature, etc.), ambient noise level and content, and so forth can either be collected by the user machine 406 or from other systems where such information is stored. This additional information is represented by other sources 408. As discussed above, interaction data can comprise information regarding the source user, the target use, the data shared and the context. By way of example, and not limitation, the interaction data can comprise one or more of:

Individual profile data for the source and/or target user. This profile data can be a personal profile, a work/business profile, or both and will comprise information such as name, location, preferences, job category, group, and any other user characteristics in a user's personal and/or business profile.

Shared data and/or shared data characteristics. The actual data can be collected for later analysis and/or the characteristics of the data collected. If a trained data annotation model exists for the interaction information (as explained in the model selection aspects of the disclosure), the data can be characterized with annotations by annotation process 420. Additionally, or alternatively, the data characteristics can be the cognitive, sensory, social characteristics previously discussed.

Contextual information such as location/GPS data, venue, channel, attendees at meetings, and so forth. Additionally, or alternatively, data collected from sensors, such as those connected to the Internet of Things (IoT) can be collected to give environmental information such as temperature, ambient noise level, type of audio in the background, activities of the user, and so forth.

The interaction data, either in the form of an interaction, a series of interactions, or in the form of an ongoing conversation is provided to the trust system 410. The trust system utilizes a supervised or unsupervised machine learning process such as a support vector machine (SVM) technique, a convolutional neural network, a deep neural network, decision tree process, k nearest neighbor process, kernel density estimation, K-means clustering, expectation maximization, and so forth to create a trust model 412 from the interaction data. This process utilizes the communications that take place to identify when and if the trust level between the source user 402 and the target user 404 change. As a representative example, consider the following series of communications between a source user and a target user.

User A to user B: I am working on the file system and was wondering if you had the latest version of the specification. My permissions have not yet been established and I cannot access the share.

1: User B to user A: Are you new in the group? I don't think I've seen you around.

2: User A to user B: I am, just moved here from Colorado.

3: User B to user A: I have family in the Durango area.

4: User A to user B: I don't get down that far usually. I'm from the Denver area.

5: User B to user A: We should talk further. Give me a call and we'll go to lunch.

6: User B to user A: Here's the latest file system spec <file attached>. Let me know if you need any other information. I can pull it from the share for you.

This series of communications can yield several interactions. For example, in communication 2 and 4, user B chooses to share general personal information about where he came from, but does not disclose items with particularity. From these two communications, the system can assemble an interaction with at least the following information for user A as a source user:

Object of trust (e.g., trust characteristics): general (as opposed to specific) personal information (in this case where user A lived before moving to her current location).

Target of trust (e.g., user characteristics): User B, and perhaps other information that the system knows about user B from user B's personal and/or work profile or other sources like workgroup, current project, current job title, and so forth.

Context of trust (e.g., context characteristics): channel: corporate mail system, sent during work hours. Location of both User B and User A was the corporate offices.

As the system continues to monitor user A's communication, the machine learning process may create a model that is able to tell that user A is comfortable sharing general (as opposed to specific) personal information with users in the same workgroup, and thus grants access to that general information (state, large metropolitan area where User A resided), while withholding the more specific information (specific location where User A resided).

Further analysis of the communication sequence yields this additional interaction for user B as a source user:

Object of trust (e.g., trust characteristics): general (as opposed to specific) personal information (in this case where user B has family).

Target of trust (e.g., user characteristics): User A, and perhaps other information that the system knows about user A from user A's personal and/or work profile or other sources like workgroup, current project, current job title, and so forth.

Context of trust (e.g., context characteristics): channel: corporate mail system, sent during work hours. Location of both User B and User A was the corporate offices.

Finally, the communication sequence yields this additional interaction for user B as a source user:

Object of trust (e.g., trust characteristics): work information related to the file system project (in this case the file system specification).

Target of trust (e.g., user characteristics): User A, and perhaps other information that the system knows about user A from user A's personal and/or work profile or other sources like workgroup, current project, current job title, and so forth.

Context of trust (e.g., context characteristics): channel: corporate mail system, sent during work hours. Location of both User B and User A was the corporate offices.

This example indicates that a sequence of communications may yield one or more interactions. To extract the interaction information, a series of communications can be analyzed to extract the relevant information and put the information into a format that the machine learning process can utilize. This can be accomplished by looking for the items specified in FIG. 2, with respect to the interaction 202 and extracting the relevant information from the communication and coupling it with additional information collected from other sources, where appropriate. This can be accomplished by a natural language processing system that extracts semantic meaning and identifies the type of information that is shared between the individuals. Many such systems and/or processes are known and can be utilized here.

The pre-processing of a sequence of communications to extract interaction information can be performed by the user machine (i.e., the source user machine) 406 and/or by the trust system. Since a sequence of communications can be monitored by multiple machines, for example user A's machine and user B's machine in the previous example, the trust system can either accept information from both machines, and eliminate redundant information or can specify one of the machines to provide the information. As yet another alternative, the two machines can coordinate so that non-overlapping information is provided to the trust system.

As previously described, the interaction information can be used by the trust system and a machine learning process to produce a trust model 412. The trust model can be created based on a particular user as a source user. In other words, each source user has one or more associated trust models that can be used to identify a trust level (i.e., data annotations), given the presented information. The trust model can be stored in a trust model store 416.

As described above, implicit and explicit feedback are used to update the trust models. Similarly, as further interactions are identified, the trust model can be updated using the new information. Thus, the trust model represents an evolving model that can be used to grant or deny access based on the current state of trust between a source user and a target user.

A gatekeeper process 414 utilizes the trust models to grant or deny access in a fluid and seamless manner. The gatekeeper process 414 either receives a request or monitors the communications and/or interactions with a user. When a request is received, the request can have the same information as an interaction: 1) an object of the trust (e.g., what data is requested such as user 1's home address); 2) a target of the trust (e.g., who is trying to access the data); and 3) context information (e.g., channel, venue, and/or other context information). The gatekeeper retrieves the appropriate trust model from the store 416 and presents the request information to the trust model. In response, the trust model will yield a set of annotations (i.e., trust level). The gatekeeper then compares the trust level with the trust level associated with the requested data. If the trust level is higher (i.e., more trusted) than or equal to the trust level of the requested data, access is granted. If not, then access is denied.

In alternative embodiments, a gatekeeper can proactively inject appropriate information into a series of communications by monitoring the communications, extracting the interaction information, identifying a trust level associated with the interaction, and then retrieving appropriate relevant information that meets the trust level and inject the information into the series of communications such as via a chat bot, a user interface (pop-up, etc.) or in some other manner as discussed below. As an alternative, the trust system can monitor the communications and present interaction information to the gatekeeper and allow the gatekeeper or another system to inject the information into the conversation in an appropriate way.

Figure 5:
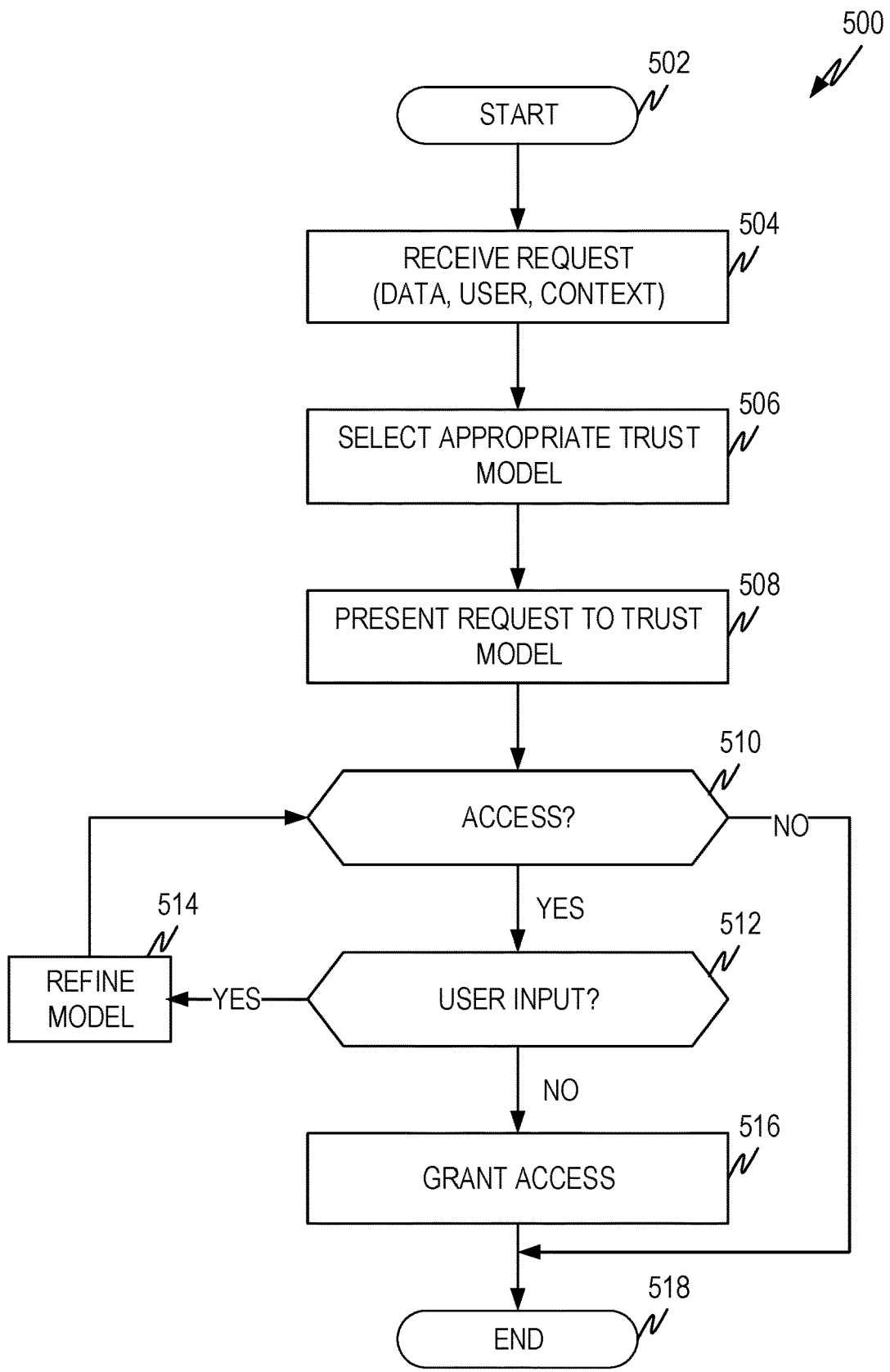
FIG. 5 illustrates a flow diagram for a gatekeeper process according to some aspects of the current disclosure.

FIG. 5 illustrates a flow diagram 500 for a gatekeeper process according to some aspects of the current disclosure.

The process begins at operation 502 and proceeds to operation 504 where a request is received. A request can include information that is the same as, or similar to, interaction information. As explained above, the request can comprise 1) an object of the trust (e.g., what data is requested such as user 1's home address); 2) a target of the trust (e.g., who is trying to access the data); and/or 3) context information (e.g., channel, venue, and/or other context information).

Based on the information in the request, the gatekeeper process selects an appropriate trust model in operation 506. Trust models, as discussed above, are developed based on interactions a source user has with one or more target users. Thus, in some embodiments a trust model is keyed to a source user. In other embodiments, a trust model is keyed to a source user and one or more other dimensions, such as a target user (target of the trust), a context (context information), a data type (object of the trust), and so forth. In this latter embodiment, a single target user may have multiple trust models associated with her, based on the dimension(s). Where trust models are keyed to both a source user and one or more other dimensions, the information received in the request can be used to select from among the different dimensions. Where trust models are keyed to the source user only, the trust model for the source user (i.e., the user whose data is being requested), the identification of the source user in the request is used to select the model.

Once the trust model is selected, the process presents the request as an input to the trust model in operation 508. The output of the trust model is a trust level and/or annotations as described above.

Operation 510 determines whether to grant access to the requested information. To determine whether to grant access to the requested information, the trust level is compared to the trust level on the requested information. If the trust level generated in operation 508 is higher (i.e., more trusted) than or equal to the trust level of the requested data, access is granted. If not, then access is denied.

When access is denied, execution proceeds to operation 518 where the process ends. Additionally, or alternatively, when access is denied, a message back to the requestor can indicate that access was denied and, in some embodiments, information about why access is denied can be presented.

If access is granted, execution proceeds to operation 512, which is an optional operation in some embodiments. In some embodiments, operation 512 does not exist. In other embodiments, whether operation 512 is performed can depend upon the derived annotations/trust level from operation 508. For example, if the trust level is below a threshold (i.e., the data protected by the trust level is less sensitive in some sense than a threshold), then the operation is not performed, while if the trust level is above the threshold, the operation is performed. In still other embodiments, operation 512 is always performed.

In operation 512 a source user may be presented with information that indicates that access to a set of information is going to be granted to a requestor (e.g., target user). The source user can allow the access to proceed (i.e., offer no input and/or confirm the gatekeeper's decision) in which case execution proceeds to operation 516 where access is granted. Operation 516 returns the requested data to the requestor and execution ends at operation 518.

Where the source user indicates that access should not be granted, execution proceeds to operation 514 where the feedback from the user is used to refine the model as explained herein. Since the requestor was denied access by the source user, execution proceeds to operation 518 and the process ends, with access denied and, in some embodiments, a message back to the requestor indicating denial and/or reasons therefore.

Figure 6:
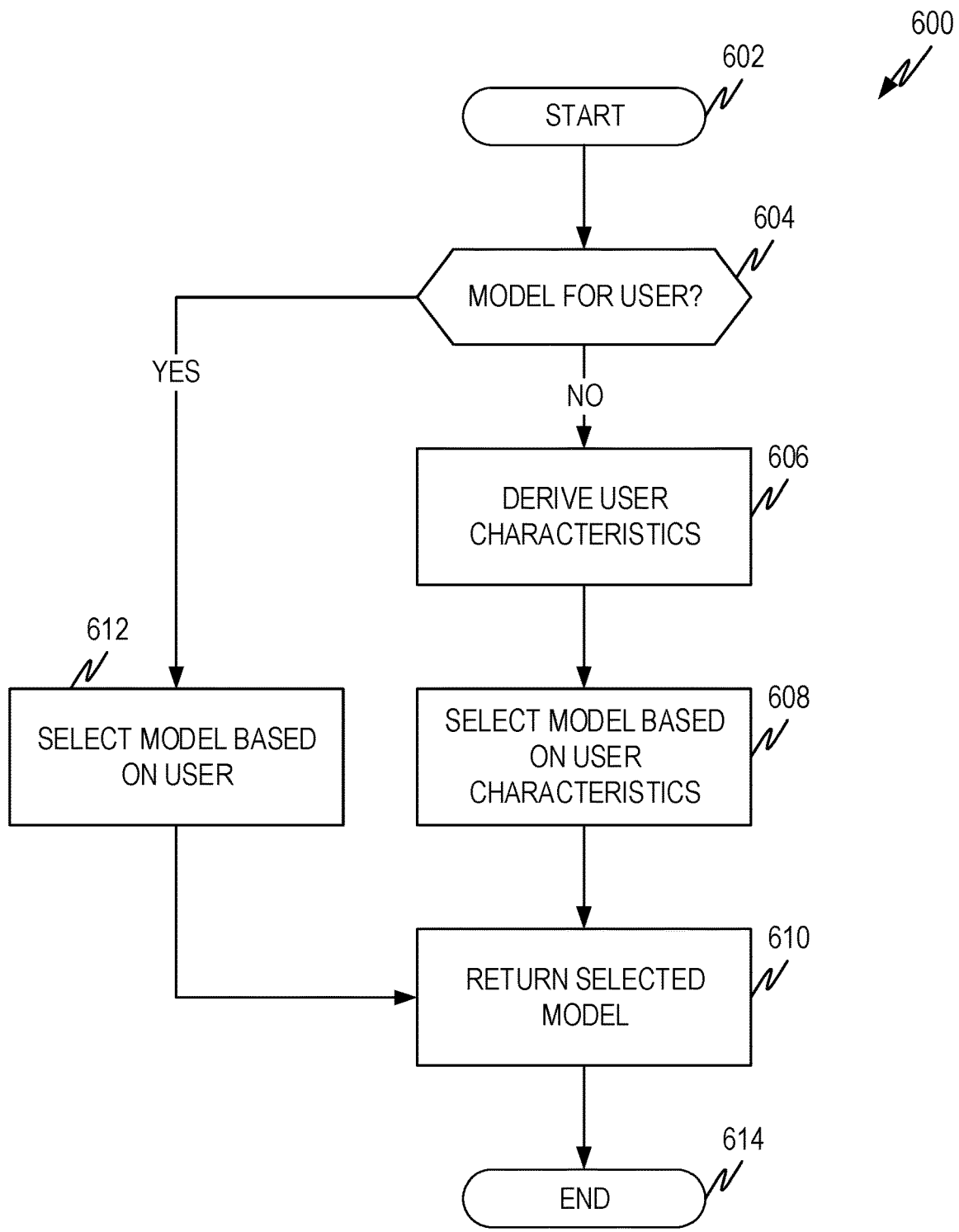
FIG. 6 illustrates a flow diagram for selecting a trust model according to some aspects of the current disclosure.

FIG. 6 illustrates a flow diagram 600 for selecting a trust model according to some aspects of the current disclosure. This selection process is a further elaboration on some embodiments of operation 506 from FIG. 5 above. The flow diagram 600 is representative of an embodiment where the trust model is keyed to both the source user and the target user. In embodiments where the trust model is keyed only to the source user, the model selection process (i.e., in operation 506 above), selects the trust model for the source user. Where the trust model is keyed to both the source user and another dimension, the selection process must also select the model based on that other dimension. The flow diagram 600 is representative of an example process. Although the flow diagram 600 is presented with the example of the trust model being keyed to the target user, the same basic diagram can be used for other dimensions as well.

The process begins at operation 602 and execution proceeds to operation 604 where the process determines whether a trust model exists for a particular source user/target user combination. If a model has been developed for the particular source user/target user combination, then execution proceeds to operation 612 where that model is selected and execution proceeds to operation 610 where the model is returned. Execution ends at operation 614.

Where no model exists for the particular source user/target user combination, execution proceeds to operation 606 where the system derives the target user's characteristics from information such as the target user profiles (both personal and work) and other data that the system has collected. The process to derive the target user's characteristics evaluates the target user data available and determines those characteristics that are similar to or the same as the user characteristics used to derive the trust model. For example, if the interaction data used to derive the trust model utilizes relationship data between a source user and a target user to train the model, then the relationship data between the source user/target user combination is also used, if available.

Once the user characteristics for the target user are derived, execution proceeds to operation 608 where a model is selected based on the source user and the target user's characteristics. In this operation, the model selected will be selected from among all source user models that were trained using target user characteristics similar to the target user being considered. For example, source user models exist that were keyed to target user A, B and D. The process 600 is now asked to identify a model for target user C. In operation 606 the user characteristics of target user C are identified and the derived characteristics are compared to the user characteristics of target user A, target user B and target user D. The model associated with the target user (e.g., A, B or D) that is most similar to target user C can be selected as model. Comparison in this instance can place the user characteristics in a vector and a vector distance or vector similarity metric can be used to determine similarity. Many such vector distances and/or vector similarity metrics are known and any can be used.

Once the model is selected, the model is returned in operation 610 and the process ends at operation 614.

Figure 7:
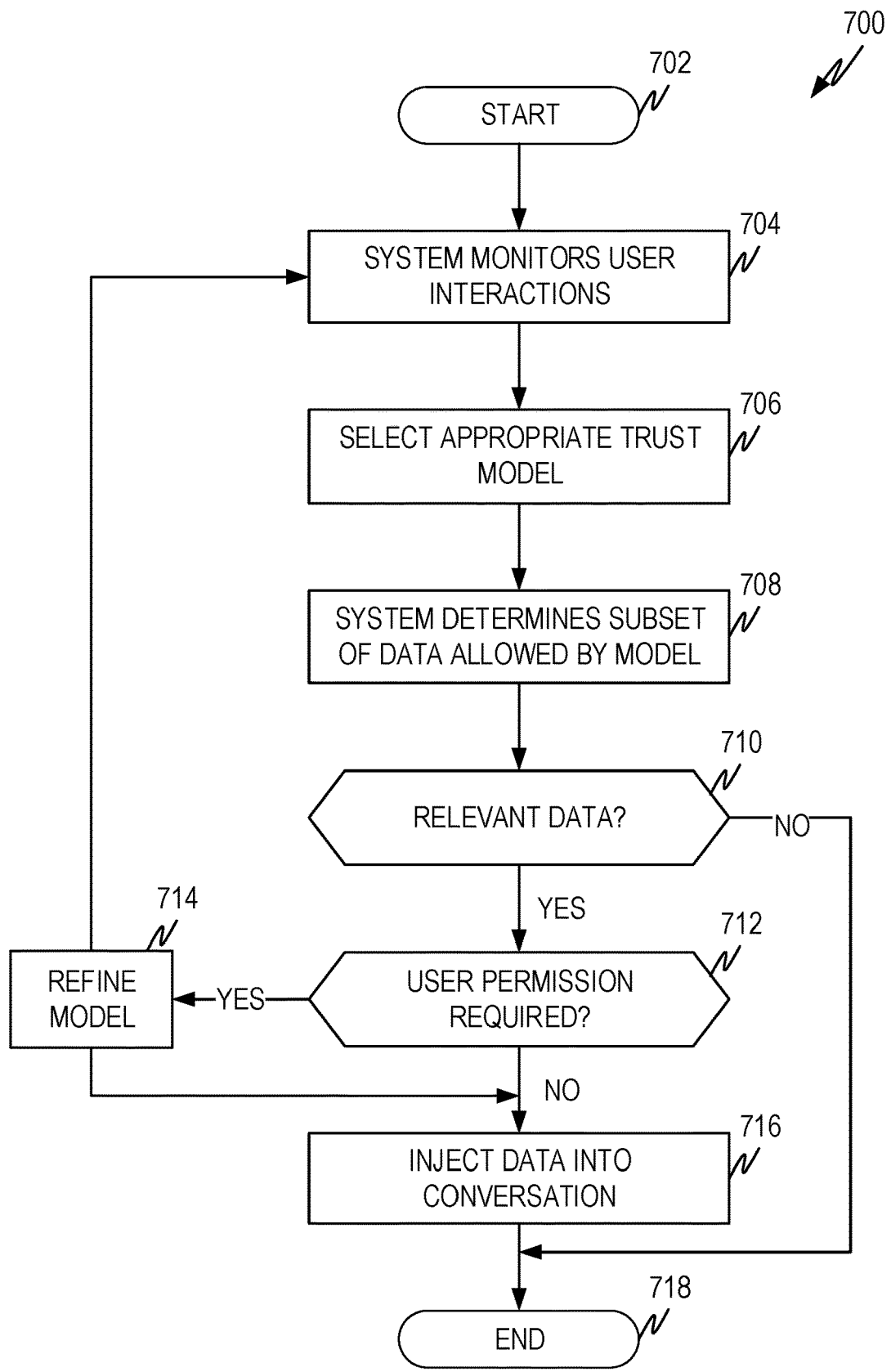
FIG. 7 illustrates a flow diagram for injecting information into a conversation according to some aspects of the current disclosure.

The description of the architecture of FIG. 4 above briefly explained the operation of a gatekeeper process 414 which can either grant access based on a request or can inject relevant information into a conversation between two users or make information available to a user during such a conversation. A representative process for granting access based on a request was explained in FIG. 5. FIG. 7 illustrates a flow diagram 700 for injecting information into a conversation according to some aspects of the current disclosure.

The process begins at operation 702 and proceeds to operation 704 where the system monitors the conversation and interactions derived therefrom. As interactions are derived, they can be used to update the trust model as explained above. These interactions, however, can also be used as "requests" which can make information available based on the trust level.

Based on an interaction identified in operation 704, an appropriate trust model is selected in operation 706. The trust model can be selected based on the source user of the interaction and/or other dimensions as described above.

Once a trust model has been identified in operation 706, operation 708 determines a subset of data to which the target user can have access based on the trust level as determined by the interaction of operation 704. As an example, consider the example conversation presented above:

1: User B to user A: Are you new in the group? I don't think I've seen you around.
2: User A to user B: I am, just moved here from Colorado.
3: User B to user A: I have family in the Durango area.
4: User A to user B: I don't get down that far usually. I'm from the Denver area.
5: User B to user A: We should talk further. Give me a call and we'll go to lunch.
6: User B to user A: Here's the latest file system spec <file attached>. Let me know if you need any other information. I can pull it from the share for you.

As explained above, this sequence yields the interaction for user B as a source user:
  Object of trust (e.g., trust characteristics): work information related to the file system project (in this case the file system specification).
  Target of trust (e.g., user characteristics): User A, and perhaps other information that the system knows about user A from user A's personal and/or work profile or other sources like workgroup, current project, current job title, and so forth.
  Context of trust (e.g., context characteristics): channel: corporate mail system, sent during work hours. Location of both User B and User A was the corporate offices.

Assuming an appropriate trust model for user B as the source user (operation 706), the interaction can be presented to the trust model and a trust level received from the trust model (operation 708). The trust level can be used to determine a subset of data that user A can have access to. For example, if the trust level produced has a trust indicator of 3 and a context of project Orlando (i.e., the file system project that user A and user B are discussing above), then based on the trust level, a user can have access to all level 3 and below information related to project Orlando. This subset is identified by comparing the trust level produced from the trust model based on the interaction to the trust level annotations on user B's data.

Once the subset is identified in operation 708, operation 710 determines if any relevant data exists in the subset. In this context relevance can be determined based on the communications between the two users. For example, if two users are discussing music bands and the first user indicates that she attended a concert for a band they are discussing, and if the system determines based on the trust level that the second user can have access to personal photos, the system can search the first user's photos for any taken at the concert by the first user.

There are numerous algorithms that determine relevance. For example, various chat bots like Xiaoice®, Rinna®, Zo® and others that use algorithms and/or machine learning to inject relevant information into a conversation. Other algorithms and/or machine learning techniques to determine relevance to a conversation can also be used. In the above example, relevance can be identified by searching the photos for bands, concerts and so forth that the conversation contains.

If no relevant data is identified, execution proceeds to operation 718 and the process ends. More particularly, in some embodiments the process returns to operation 704 to wait for a new interaction.

If relevant data is identified, operation 712 determines whether user permission is required to present the information. Note that this operation need not be performed in all embodiments. As in FIG. 5 above, in some embodiments, whether a source user needs to grant permission (i.e., whether a confirmation dialog or other such indictor is presented to a source user) can be based on the trust level. Thus, in some embodiments highly personal information may need confirmation from the source user while less sensitive information may not. Furthermore, in some embodiments, such a confirmation is always presented, while in others it is never presented.

If user permission is required, a confirmation dialog or other indicator is presented to the source user as discussed herein. If the user provides feedback (e.g., confirmation, denial) the model can be refined (operation 714) based on the feedback and the system either injects the data into the conversation or makes the data available (operation 716) if the source user indicates that it was ok to allow access to the data. Otherwise, if the source user indicated that access was not have access to the data, the system can return to operation 704 and monitor additional interactions.

Operation 716 either makes the data available or injects the data into the conversation. For example, if the conversation between the first and second user above has these exchanges:

1: User 1 to user 2: So what type of music do you like?
2: User 2 to user 1: You name it I like it.
3: User 2 to user 1: However, my favorite band is the Dead Zone.
4: User 1 to user 2: Hah! I saw them play at a small dive in Washington last month. Got the pictures to prove it.

At this point, the system can derive the interaction where user 1 is the source user and:

Object of trust (e.g., trust characteristics): personal information related to the bands and/or type of music the user likes (in this case the file system specification).
Target of trust (e.g., user characteristics): User 2, and perhaps other information that the system knows about user 2 from user 2's personal and/or work profile or other sources like social media relationships, number of past conversations, etc.
Context of trust (e.g., context characteristics): channel: personal chat between the two users.

Based on this interaction, the system can derive a trust level. The search of user 1's data indicates that photos from the event are available and within the allowed trust level. Assuming no user permission is required prior to making the information available, the system can inject the data into the conversation via chat bot:

5: Chatbot to user 1 and user 2: Want to see the photos?<link>.

The information can also be made available in other ways appropriate to the conversation, communication channel, and so forth.

Figure 8:
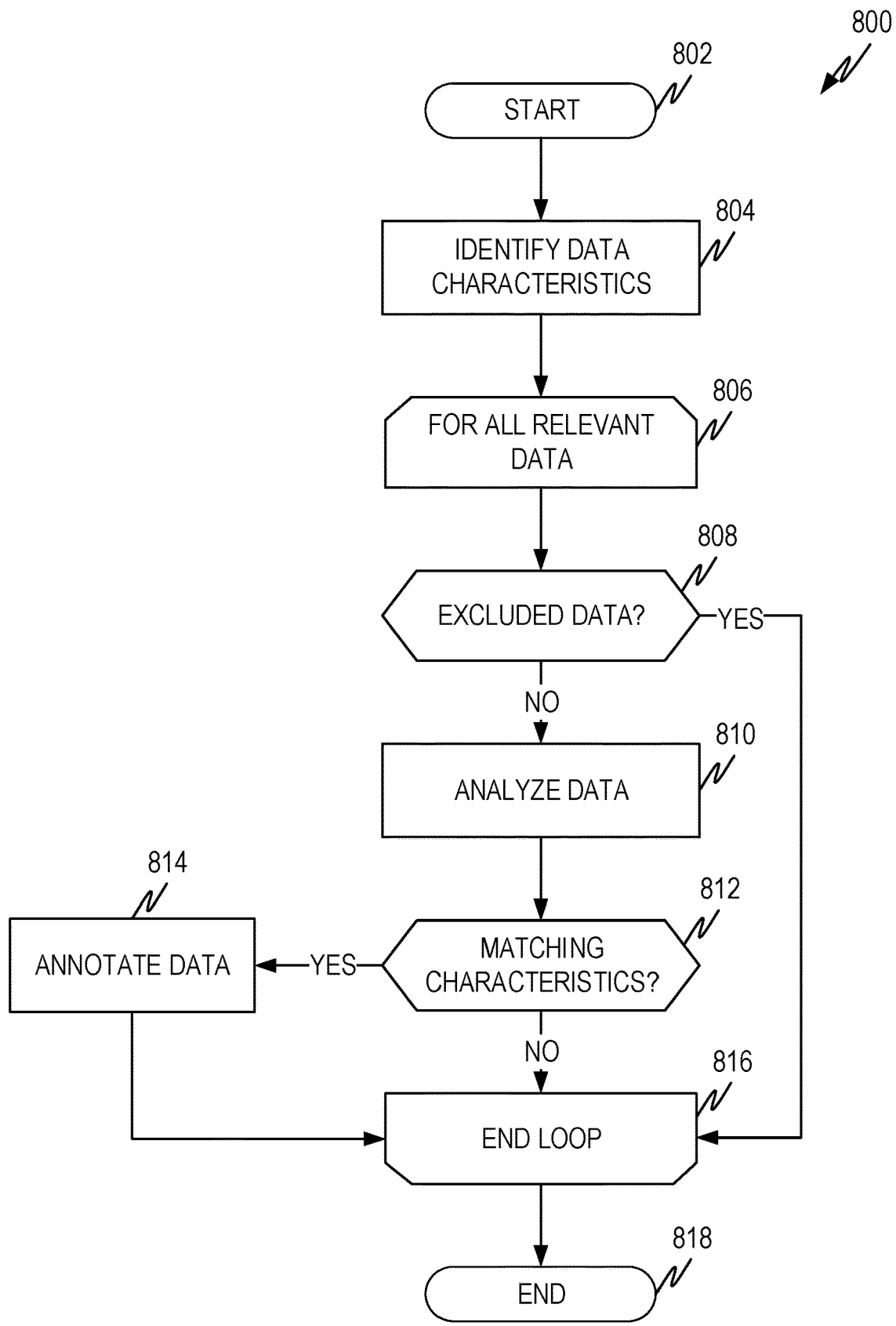
FIG. 8 illustrates a flow diagram for annotating data according to some aspects of the current disclosure.

FIG. 8 illustrates a flow diagram 800 for annotating data according to some aspects of the current disclosure. The process begins at operation 802 and proceeds to optional operation 804. In this optional operation, the data characteristics that identify which data is to be annotated are identified. This is useful, for example, if only some data, rather than all data, is to be annotated. For example, only work data or personal data are to be annotated, then this operation can be performed.

The remainder of the operations form a loop that executes over all relevant data, for example, user 1 data. The loop begins at operation 806 and the next document is identified. Operation 808 tests whether the document should be excluded from annotation consideration. This allows some data to be placed off limits from annotation (i.e., the unannotated data 428 of FIG. 4). If the data is excluded from annotation, the next document is selected as identified by the "YES" path to the end loop operation 816.

Assuming the data is not excluded, operation 810 analyzes the data to identify data characteristics that can be matched against the characteristics from operation 804, if applicable. Operation 812 then tests for the match, if applicable, and assuming the data is of the type to be annotated, operation 814 annotates the data.

As explained above, the data can be annotated through an annotation model. The annotation model can be the same as the trust model or different from the trust model. The annotation model is trained using a machine learning process as described above. The annotation model takes as an input data to be annotated and gives as an output annotations to be applied to the data and/or annotated data. As described herein, the annotations are also referred to as a trust level.

Once operation 816 determines that all relevant data has been examined, the process ends at 818.

Figure 9:
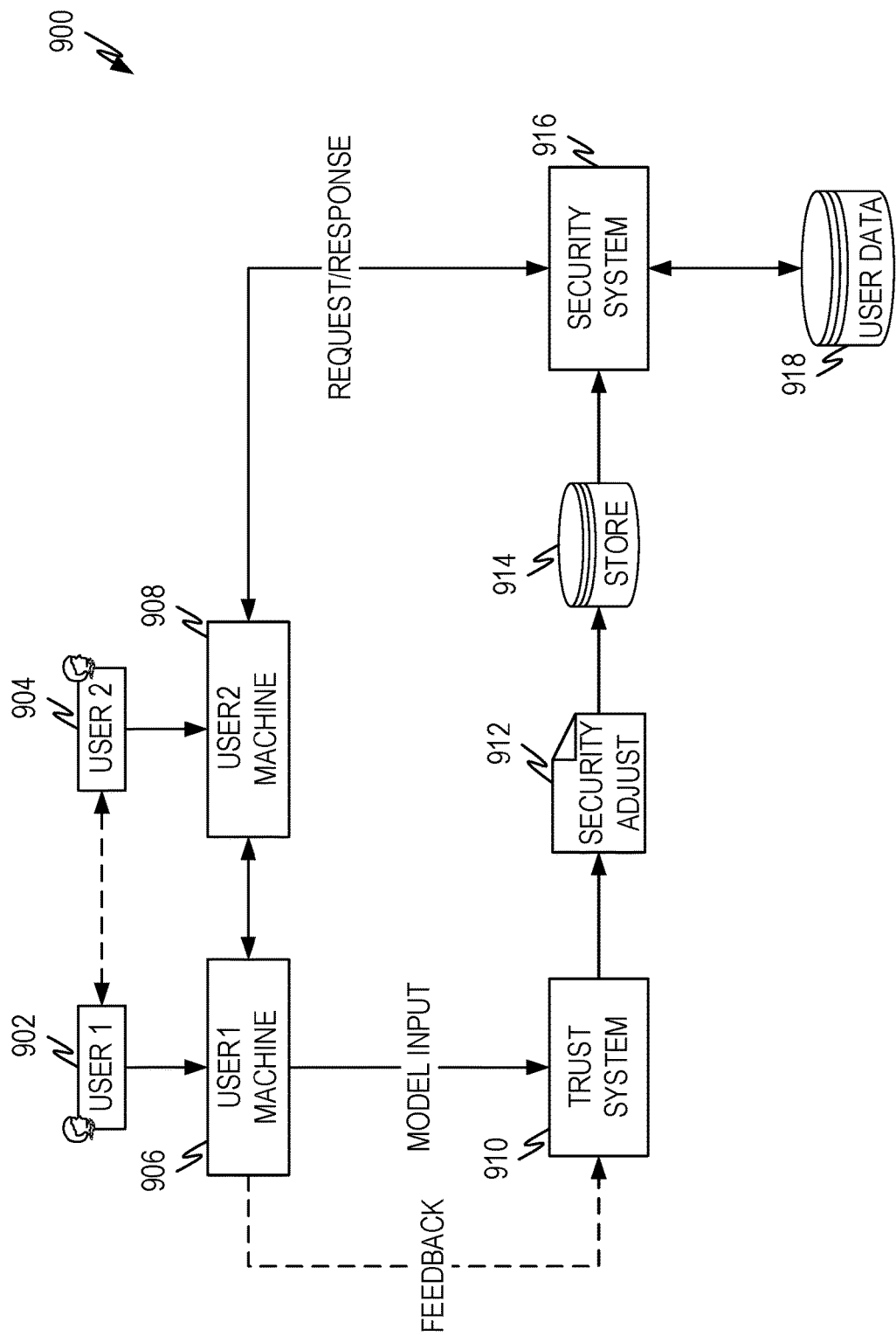
FIG. 9 illustrates an architecture diagram for automatically adjusting access rights according to some aspects of the current disclosure.

FIG. 9 illustrates an architecture diagram 900 for automatically adjusting access rights according to some aspects of the current disclosure. In the above embodiments, a trust level is derived from user interactions and utilized to grant or deny access to user data. However, for systems that have an established data protection system, such as a security model that grants or denies access to data. Such a system can use ACLs, read/write permissions, group membership and other such information to grant or deny access to information. The methodologies described herein can also apply to such security models.

In such embodiments, the trust system 910 functions as described above in conjunction with FIG. 4, except the trust model becomes a security adjustment model 912. The security adjustment model 912 is derived using the machine learning techniques described above. The trained model takes as an input data that can be the same as, or less than, the interaction data described above. The output of the security adjustment model are the security settings that need to be applied in the security system 916 to grant or deny access to the data.

Thus, the same monitoring of communications and/or interactions between two users (902 and 904) and the same information is collected from the user machines 906, 908, and other sources as described above. The model is trained using the same or similar inputs and the output of the model is the adjusted security settings that are then applied to the security system 916 to implement the grant/deny access rights.

A representative example can show how the architecture can be utilized. Suppose that a first user repeatedly forwards email regarding a particular project to a group of other users, when they are not on the email. The trust system 910 can extract interactions from the activity and train one or more security rights adjustment models 912. When a new email comes in that pertains to the same project, the system can note the arrival of the information and, based on the security model, ask the user if the email should be forwarded to the group. If the source user agrees, the security model can modify the settings in the email system to provide for automatic forwarding and/or other access to information having the appropriate trust level.

A few characteristics of the above embodiments should be noted and are presented here to make sure they are not lost.

Since the system can continuously monitor user interactions, the grant and/or denial of information can happen in real time or near real time. In other words, a user's trust level can be constantly monitored and adjusted so that information is either made available or removed from availability based on the current state of a user's trust level. This makes the system very dynamic and fluid, and avoids problems with prior systems where a user had to request access to information from an administrator or other entity. It also avoids the user having manage access, for those systems that give the user rights to manage access.

Interactions with one user can give clues as to how other users with similar characteristics are to be treated. As described above, certain embodiments allow the trust model to be selected based on user identity and/or user characteristics. This results in a system that can apply transitive trust. For example, if the trust model is keyed only to a source user, as the user presents interactions with various users, the trust model will evolve to grant access to other users that have similar user characteristics. For example, if I grant access to family members to my private photo collection, when a new family member requests access, the trust model will have evolved to grant access to my private photo collection to the new family member that I have not corresponded with before. This is because the machine learning technique will pick out similarities in user characteristics and grant similar users similar access. The same can be true of trust models keyed to the source user and to other dimensions in certain implementations.

Transitive trust can also be disabled for information based on trust level, data category, or other data characteristics. A test can be placed in gatekeeper process to identify whether transitive trust should be disabled, and if so, only proceed for target users that were used to train the trust model(s). For example, somewhere prior to operation 510, the identity of requestor can be compared against the identities of users used to train the trust model and if the identity of the requestor was not used to train the trust model, the access is denied.

Although most examples of interactions presented in this disclosure discuss indicators of when access should be granted, similar indicators identify when access should be denied. Thus, a user that refuses to give out information or interactions that otherwise indicate that the source user will not grant access to the target user for particular type of data will train the trust model on when to deny access. The trust level represents a dynamic rising and falling metric(s) that will both increase access to information as user trust rises and deny access to information as user trust falls.

The context also influences the trust model so that the trust model will take into account the context of the request as well as the information requested and the user making the request. For example, the trust model may learn that a user is willing to share certain types of information with a set of other users in a private 1:1 conversation, but not when others are around. Thus, the model may otherwise deny access to information if the request is for a venue that is not a 1:1 conversation when others are not present.

Although embodiments and architectures are described as using off device resources to derive the trust model and grant or deny access, local device embodiments are also possible. Where the local device has sufficient computing power, the off-device aspects can be moved to the local device. Where the local device has more constrained computing power, such as a wearable, mobile phone, tablet, or other more constrained device, computationally intensive aspects can be offloaded to off-device resources and local resources used for the less computationally intensive aspects. For example, if the device is not computationally sufficient to derive the trust model, the trust model can be derived off device and downloaded to the device so the device and use it to grant or deny access to information. Other combinations are also possible.

As an example of using a trust model local to the device, a trust model is derived and downloaded to the local device (e.g., local machine 402). The local device has a keyboard application that monitors user keystrokes and other communications and, based on the keystrokes, derives interaction data that is presented to the trust model. The trust model can then decide whether information can be made available and inject the information into the communication.

As an example of how this can be implemented, the process of FIG. 7 (perhaps modified where one or more of the operations are eliminated and/or simplified) is implemented by the keyboard. As the user types information into the keyboard, operation 718 can inject relevant information into the conversation, either by using a chatbot as described above, or by using other user interface mechanisms. For example, keyboard applications on mobile phones often have word correction and prediction technology that are presented in a selection area where users can select them instead of choosing to complete typing of the word. In this example, the user may be chatting with another user and wants to share his home address. As the user types "let me give you my information," the process of FIG. 7 can identify that the user is attempting to share a class of personal information such as home address, phone number and so forth. Operation 716 can then cause the keyboard, in a selection area similar to that discussed, present a choice of information such as "phone number," "home address," "current location" and so forth that can be selected by the user. Once the selection is made, the corresponding information can be inserted into the text message.

Example Machine Architecture and Machine-Readable Medium

Figure 10:
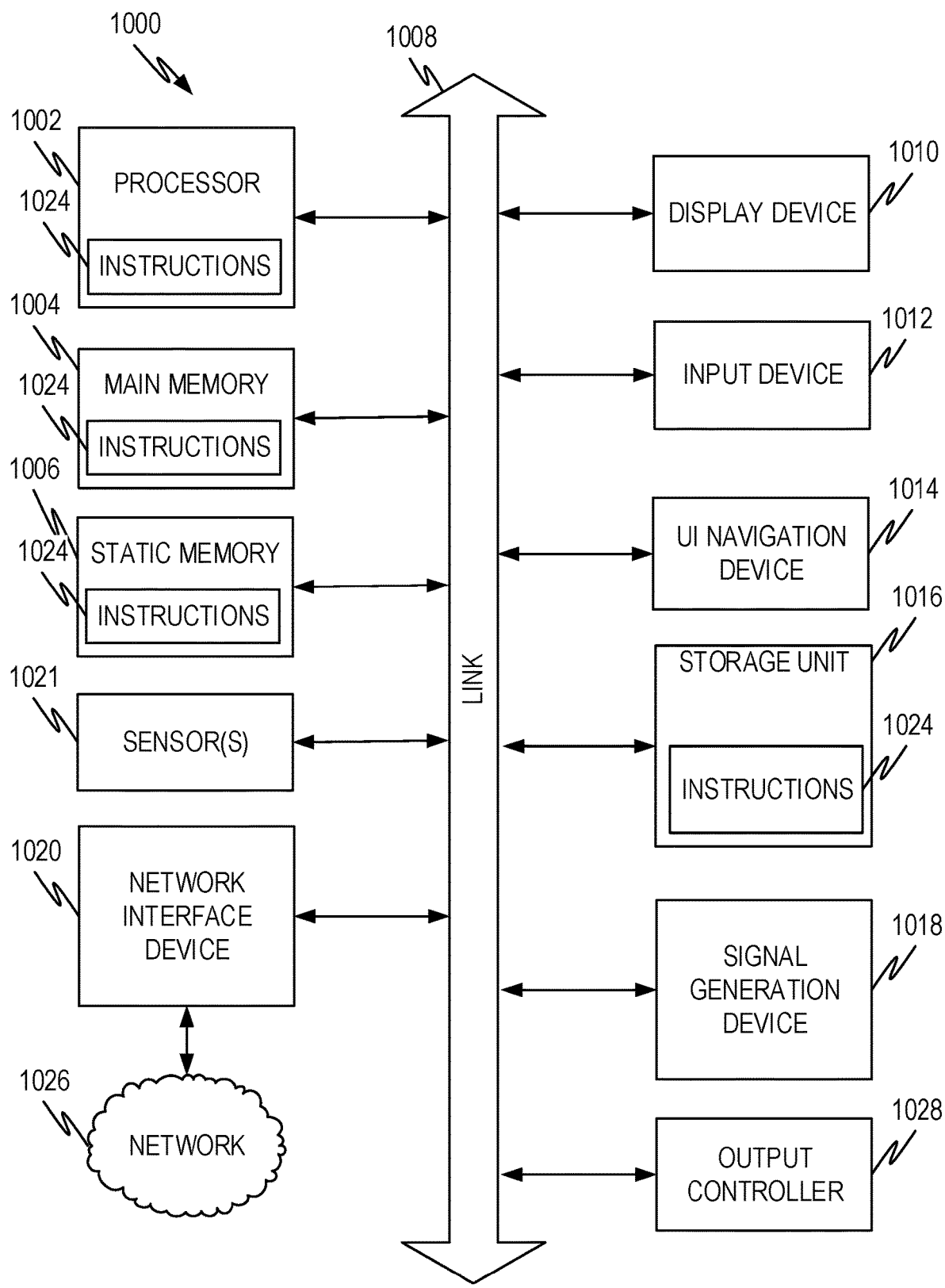
FIG. 10 illustrates a representative machine architecture suitable for implementing the systems and other aspects disclosed herein or for executing the methods disclosed herein.

FIG. 10 illustrates a representative machine architecture suitable for implementing the systems and so forth or for executing the methods disclosed herein. The machine of FIG. 10 is shown as a standalone device, which is suitable for implementation of the concepts above. For the server aspects described above a plurality of such machines operating in a data center, part of a cloud architecture, and so forth can be used. In server aspects, not all of the illustrated functions and devices are utilized. For example, while a system, device, etc. that a user uses to interact with a server and/or the cloud architectures may have a screen, a touch screen input, etc., servers often do not have screens, touch screens, cameras and so forth and typically interact with users through connected systems that have appropriate input and output aspects. Therefore, the architecture below should be taken as encompassing multiple types of devices and machines and various aspects may or may not exist in any particular device or machine depending on its form factor and purpose (for example, servers rarely have cameras, while wearables rarely comprise magnetic disks). However, the example explanation of FIG. 10 is suitable to allow those of skill in the art to determine how to implement the embodiments previously described with an appropriate combination of hardware and software, with appropriate modification to the illustrated embodiment to the particular device, machine, etc. used.

While only a single machine is illustrated, the term "machine" shall also be taken to include any collection of machines that individually or jointly execute a set (or multiple sets) of instructions to perform any one or more of the methodologies discussed herein.

The example of the machine 1000 includes at least one processor 1002 (e.g., a central processing unit (CPU), a graphics processing unit (GPU), advanced processing unit (APU), or combinations thereof), one or more memories such as a main memory 1004, a static memory 1006, or other types of memory, which communicate with each other via link 1008. Link 1008 may be a bus or other type of connection channel. The machine 1000 may include further optional aspects such as a graphics display unit 1010 comprising any type of display. The machine 1000 may also include other optional aspects such as an alphanumeric input device 1012 (e.g., a keyboard, touch screen, and so forth), a user interface (UI) navigation device 1014 (e.g., a mouse, trackball, touch device, and so forth), a storage unit 1016 (e.g., disk drive or other storage device(s)), a signal generation device 1018 (e.g., a speaker), sensor(s) 1021 (e.g., global positioning sensor, accelerometer(s), microphone(s), camera(s), and so forth), output controller 1028 (e.g., wired or wireless connection to connect and/or communicate with one or more other devices such as a universal serial bus (USB), near field communication (NFC), infrared (IR), serial/parallel bus, etc.), and a network interface device 1020 (e.g., wired and/or wireless) to connect to and/or communicate over one or more networks 1026.

Executable Instructions and Machine-Storage Medium

The various memories (i.e., 1004, 1006, and/or memory of the processor(s) 1002) and/or storage unit 1016 may store one or more sets of instructions and data structures (e.g., software) 1024 embodying or utilized by any one or more of the methodologies or functions described herein. These instructions, when executed by processor(s) 1002 cause various operations to implement the disclosed embodiments.

As used herein, the terms "machine-storage medium," "device-storage medium," "computer-storage medium" mean the same thing and may be used interchangeably in this disclosure. The terms refer to a single or multiple storage devices and/or media (e.g., a centralized or distributed database, and/or associated caches and servers) that store executable instructions and/or data. The terms shall accordingly be taken to include storage devices such as solid-state memories, and optical and magnetic media, including memory internal or external to processors. Specific examples of machine-storage media, computer-storage media and/or device-storage media include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks. The terms machine-storage media, computer-storage media, and device-storage media specifically exclude carrier waves, modulated data signals, and other such media, at least some of which are covered under the term "signal medium" discussed below.

Signal Medium

The term "signal medium" shall be taken to include any form of modulated data signal, carrier wave, and so forth. The term "modulated data signal" means a signal that has one or more of its characteristics set or changed in such a matter as to encode information in the signal.

Computer Readable Medium

The terms "machine-readable medium," "computer-readable medium" and "device-readable medium" mean the same thing and may be used interchangeably in this disclosure. The terms are defined to include both machine-storage media and signal media. Thus, the terms include both storage devices/media and carrier waves/modulated data signals.

EXAMPLE EMBODIMENTS

Example 1

A method for automatically granting access to user data, comprising:

receiving a plurality of interactions from a first user to a second user, each interaction comprising an identity of the second user, information communicated to the second user, and a context in which the information was communicated;

deriving a trust model from the plurality of interactions using a machine learning technique;

receiving information comprising a request for first user data or a communication from the first user, the information comprising:

a user identity;

identification of first user data; and a context in which the request or communication is made;

selecting the trust model from among a plurality of trust models based on the user identity;

presenting the request or communication to the trust model and in response to the request or communication, receiving a trust level or a security model setting; and granting or denying access to first user data based on the trust level or the security model setting.

Example 2

The method of example 1 wherein:

the user identity is the second user;

the information is a request; and the first user data is first user data requested by the request.

Example 3

The method of example 1 wherein:

the user identity is not the second user;

the information is a request; and the first user data is first user data requested by the request.

Example 4

The method of example 1 wherein the user identity is the second user and the information is a communication is between the first user and the second user and wherein the method further comprises:
injecting the first user data into a conversation between the first user and second user.

Example 5

The method of example 1 further comprising:
presenting notification to the first user prior to granting or denying access, the notification requesting confirmation from the first user regarding granting or denying access.

Example 6

The method of example 5 wherein the notification is presented or not based on the trust level or security model setting.

Example 7

The method of example 1 further wherein the user identity is the second user and the information is a communication is between the first user and the second user and wherein the method further comprises:
selecting the first user data based on the trust model; and
injecting the first user data into a conversation between the first user and second user.

Example 8

The method of example 1, 2, 3, 4, 5, 6, or 7 further comprising:
annotating a subset of user data, the annotation indicating what trust level or security model setting grants access to the annotated user data, the annotated data comprising the first user data.

Example 9

The method of example 8 wherein the subset is less than all user data such that a portion of user data remains unannotated.

Example 10

A system for automatically granting access to user data comprising a processor and computer executable instructions, that when executed by the processor, cause the system to perform operations comprising:
receiving a plurality of interactions from a first user to a second user, each interaction comprising an identity of the second user, information communicated to the second user, and a context in which the information was communicated;
deriving a trust model from the plurality of interactions using a machine learning technique;
receiving a communication from the first user comprising:
a user identity;
identification of first user data communicated to a user associated with the user identity, the first user data being a part of a larger body of first user data; and
a context in which the communication is made;
selecting the trust model from among a plurality of trust models based on the identity of the user;
identifying a subset of the larger body of first user data based on the trust model that the user is allowed access to;
identifying a portion of the subset that is relevant to the communication; and
injecting the portion into a conversation between the first user and the user.

Example 11

The system of example 10 wherein the user is the second user.

Example 12

The system of example 10 wherein the user is not the second user.

Example 13

The system of example 10 further comprising presenting notification to the first user prior to granting or denying access, the notification requesting confirmation from the first user regarding granting or denying access.

Example 14

The system of example 10 wherein identifying the subset of the larger body of first user data based on the trust model comprises:
presenting the communication to the trust model and receiving in response a trust level or security model setting;
evaluating the larger body of first user data; and
selecting as part of the subset of the larger body of first user data that first user data that meets the trust level or security model setting.

Example 15

The system of example 14 further comprising:
identifying the trust level associated with the portion of the subset; and
determining whether to present a notification to the first user based on the trust level associated with the portion of the subset.

Example 16

The system of example 10 further comprising:
annotating the larger body of first user data, the annotation indicating what trust level or security model setting grants access to the annotated first user data.

Example 17

The system of example 16 wherein after annotating the larger body of first user data, the first user's data comprises an annotated portion and an unannotated portion.

Example 18

The system of example 10, 11, 12, 13, 14, 15, 16 of 17 further comprising:
receiving feedback from the first user; and
updating the selected trust model based on the received feedback.

Example 19

A computer storage medium comprising executable instructions that, when executed by a processor of a machine, cause the machine to perform operations comprising:
receiving a plurality of interactions from a first user to a second user, each interaction comprising an identity of the second user, information communicated to the second user, and a context in which the information was communicated;
deriving a trust model from the plurality of interactions using a machine learning technique;
based on the trust model, annotating a larger body of first user data to identify a trust level or a security model setting required to access each item of first user data in the larger body;
receiving information comprising a request for first user data or a communication from the first user, the information comprising:
a user identity;
identification of first user data; and
a context in which the request or communication is made;
selecting the trust model from among a plurality of trust models based on the user identity;
presenting the request or communication to the trust model and in response to the request or communication, receiving a trust level or a security model setting; and
granting or denying access to first user data based on the trust level or the security model setting.

Example 20

The medium of example 19 further comprising:
receiving feedback from the first user regarding the access granted or denied; and
updating the selected trust model based on the feedback.

Example 21

A method for automatically granting access to user data, comprising:
receiving a plurality of interactions (202) from a first user to a second user, each interaction comprising an identity of the second user, information communicated to the second user, and a context in which the information was communicated;
deriving a trust model (302, 412, 912) from the plurality of interactions using a machine learning technique;
receiving information (504, 704) comprising a request for first user data or a communication from the first user, the information comprising:
a user identity;
identification of first user data; and
a context in which the request or communication is made;
selecting the trust model (506, 706) from among a plurality of trust models based on the user identity;
presenting the request or communication to the trust model (508, 708) and in response to the request or communication, receiving a trust level or a security model setting; and
granting or denying access to first user data based on the trust level or the security model setting (516, 716).

Example 22

The method of example 21 wherein:
the user identity is the second user;
the information is a request; and
the first user data is first user data requested by the request.

Example 23

The method of example 21 wherein:
the user identity is not the second user;
the information is a request; and
the first user data is first user data requested by the request.

Example 24

The method of example 21 wherein the user identity is the second user and the information is a communication is between the first user and the second user and wherein the method further comprises:
injecting the first user data into a conversation between the first user and second user.

Example 25

The method of example 24 wherein the notification is presented or not based on the trust level or security model setting.

Example 26

The method of example 21 further wherein the user identity is the second user and the information is a communication is between the first user and the second user and wherein the method further comprises:
selecting the first user data based on the trust model; and
injecting the first user data into a conversation between the first user and second user.

Example 27

The method of example 21, 22, 23, 24, 25, or 26 further comprising:
annotating a subset of user data, the annotation indicating what trust level or security model setting grants access to the annotated user data, the annotated user data comprising the first user data.

Example 28

The method of example 27 wherein the subset is less than all user data such that a portion of user data remains unannotated.

Example 29

The method of examples 21, 22, 23, 24, 25, 26, 27, or 28, further comprising:
identifying a subset of a larger body of first user data based on the trust model that the user is allowed access to;
identifying a portion of the subset that is relevant to the communication; and
injecting the portion into a conversation between the first user and the user.

Example 30

The method of example 29 wherein the user is the second user.

Example 31

The method of example 29 wherein the user is not the second user.

Example 32

The method of example 29 wherein identifying the subset of the larger body of first user data based on the trust model comprises:
presenting the communication to the trust model and receiving in response a trust level or security model setting;
evaluating the larger body of first user data; and
selecting as part of the subset of the larger body of first user data that first user data that meets the trust level or security model setting.

Example 33

The method of example 21, 22, 23, 24, 25, 26, 27, 28, 29, 30, 31 or 32 further comprising:
presenting notification to the first user prior to granting or denying access, the notification requesting confirmation from the first user regarding granting or denying access.

Example 34

An apparatus comprising means to perform a method as in any preceding example.

Example 35

Machine-readable storage including machine-readable instructions, when executed, to implement a method or realize an apparatus as in any preceding example.

CONCLUSION

In view of the many possible embodiments to which the principles of the present invention and the forgoing examples may be applied, it should be recognized that the examples described herein are meant to be illustrative only and should not be taken as limiting the scope of the present invention. Therefore, the invention as described herein contemplates all such embodiments as may come within the scope of the following claims and any equivalents thereto.

What is claimed is:

1. A method for automatically granting access to user data, comprising:
    receiving a plurality of interactions from a first user to a second user, each interaction comprising an identity of the second user, information communicated to the second user, and a context in which the information was communicated;
    deriving a trust model from the plurality of interactions using a machine learning technique;
    without user intervention, annotating a subset of user data, the annotation indicating what trust level or security model setting grants access to the annotated user data, the annotated user data comprising first user data;
    receiving either a request for the first user data from a requesting user or a communication from the first user to a receiving user;
    responsive to receiving the request:
        selecting the trust model from among a plurality of trust models based on an identity of the requesting user;
        presenting the request to the trust model and in response, receiving a trust level or a security model setting; and
        granting or denying access to the first user data based on the trust level or the security model setting;
    responsive to receiving the communication:
        selecting the trust model from among the plurality of trust models based on an identity of the receiving user;
        identifying a subset of annotated user data that the receiving user is allowed to access based on the trust model;
        determining whether data relevant to a conversation between the first user and the receiving user exists in the subset of annotated user data; and
        responsive to determining data relevant to the conversation exists, injecting at least a portion of the relevant data into the conversation.

2. The method of claim 1 wherein the request comprises:
    the identity of the requesting user;
    identification of the first user data; and
    a context in which the request is made.

3. The method of claim 1 wherein the communication comprises:
    the identity of the receiving user; and
    information communicated between the first user and the receiving user.

4. The method of claim 1 wherein the requesting user is not the second user.

5. The method of claim 1 wherein responsive to receiving the request, the method further comprises:
    presenting notification to the first user prior to granting or denying access, the notification requesting confirmation from the first user regarding granting or denying access.

6. The method of claim 5 wherein the notification is presented or not based on the trust level or security model setting.

7. The method of claim 1 further wherein the receiving user is not the second user.

8. The method of claim 1 wherein the subset of user data is less than all user data such that a portion of the user data remains unannotated.

9. A system for automatically granting access to user data comprising a hardware processor and computer executable instructions, that when executed by the hardware processor, cause the system to perform operations comprising:
    receiving a plurality of interactions from a first user to a second user, each interaction comprising an identity of the second user, information communicated to the second user, and a context in which the information was communicated;
    deriving a trust model from the plurality of interactions using a machine learning technique;
    without user intervention, annotating a larger body of first user data, the annotation indicating what trust level or security model setting grants access to the annotated first user data;
    receiving a communication from the first user comprising:
        a user identity;

identification of first user data communicated to a user associated with the user identity, the first user data being a part of the larger body of first user data; and a context in which the communication is made;

selecting the trust model from among a plurality of trust models based on the identity of the user;

identifying a subset of the larger body of first user data based on the trust model that the user is allowed access to;

identifying a portion of the subset that is relevant to the communication; and injecting the portion into a conversation between the first user and the user.

10. The system of claim 9 wherein the user is the second user.

11. The system of claim 9 wherein the user is not the second user.

12. The system of claim 9 further comprising presenting notification to the first user prior to granting or denying access, the notification requesting confirmation from the first user regarding granting or denying access.

13. The system of claim 9 wherein identifying the subset of the larger body of first user data based on the trust model comprises:

presenting the communication to the trust model and receiving in response a trust level or security model setting;

evaluating the larger body of first user data; and selecting as part of the subset of the larger body of first user data the first user data that meets the trust level or security model setting.

14. The system of claim 13 further comprising:

identifying the trust level associated with the portion of the subset; and determining whether to present a notification to the first user based on the trust level associated with the portion of the subset.

15. The system of claim 9 wherein after annotating the larger body of first user data, the first user's data comprises an annotated portion and an unannotated portion.

16. The system of claim 9 further comprising:

receiving feedback from the first user; and updating the selected trust model based on the received feedback.

17. A computer storage medium comprising executable instructions that, when executed by a processor of a machine, cause the machine to perform operations comprising:

receiving a plurality of interactions from a first user to a second user, each interaction comprising an identity of the second user, information communicated to the second user, and a context in which the information was communicated;

deriving a trust model from the plurality of interactions using a machine learning technique;

deriving a trust level for each item in a body of first user data using the trust model;

without user intervention, annotating each item with a corresponding trust level, or adjusting a security model setting required to access each item, or both;

receiving information comprising a request for the first user data or a communication from the first user, the information comprising:

a user identity;

identification of the first user data; and a context in which the request or communication is made;

selecting the trust model from among a plurality of trust models based on the user identity;

presenting the request or communication to the trust model and in response to the request or communication, receiving a trust level or a security model setting; and granting or denying access to the first user data based on the trust level or the security model setting.

18. The medium of claim 17 further comprising:

receiving feedback from the first user regarding the access granted or denied; and updating the selected trust model based on the feedback.

* * * * *